United States Patent [19]
Chase

[11] Patent Number: 6,082,829
[45] Date of Patent: Jul. 4, 2000

[54] WHEEL AND OVERLAY ASSEMBLY

[75] Inventor: Lee A. Chase, Ada, Mich.

[73] Assignee: Lacks Industries Inc., Grand Rapids, Mich.

[21] Appl. No.: 08/923,828

[22] Filed: Sep. 4, 1997

Related U.S. Application Data

[63] Continuation-in-part of application No. 08/631,178, Apr. 12, 1996, abandoned.

[51] Int. Cl.$^7$ ...................................................... B60B 7/02
[52] U.S. Cl. .................................. 301/37.43; 301/37.28; 301/37.1
[58] Field of Search .................................... 301/6.3, 37.1, 301/37.28, 37.42, 37.43, 108.1

[56] References Cited

U.S. PATENT DOCUMENTS

| | | | |
|---|---|---|---|
| 2,016,395 | 10/1935 | Sinclair | 301/37.37 |
| 2,857,022 | 10/1958 | Lyon | 301/6.3 |
| 2,857,025 | 10/1958 | Lyon | 301/6.3 |
| 3,517,968 | 6/1970 | Tully et al. | 29/894.38 |
| 3,726,566 | 4/1973 | Beith | 301/37.1 |
| 4,219,241 | 8/1980 | Muller et al. | 301/6.3 |
| 4,606,582 | 8/1986 | Warren | 301/37.37 |
| 4,682,820 | 7/1987 | Stalter | 301/37.28 |
| 4,708,398 | 11/1987 | Loren | 301/37.42 |
| 4,976,497 | 12/1990 | Post et al. | 301/37.43 |
| 5,128,085 | 7/1992 | Post et al. | |
| 5,143,426 | 9/1992 | Todd | 301/37.43 |
| 5,188,428 | 2/1993 | Carter, III | 301/37.1 |
| 5,188,429 | 2/1993 | Heck et al. | |
| 5,253,928 | 10/1993 | Patti | |
| 5,340,201 | 8/1994 | Weirs | 301/37.42 |
| 5,368,370 | 11/1994 | Beam | 301/37.36 |
| 5,435,631 | 7/1995 | Maloney et al. | 301/37.36 |

*Primary Examiner*—Russell D. Stormer
*Attorney, Agent, or Firm*—VanOphem Meehan & VanOphem, P.C.

[57] ABSTRACT

A wheel and overlay assembly employing an overlay configured to more fully control the aesthetic appearance of the assembly. The wheel and overlay assembly employs an overlay that more completely establishes the decorative appearance of the assembly, thereby enabling the use of a standardized wheel whose design and construction considerations are based almost solely on the structural requirements of the assembly. As such, the overlay is adapted to enable the functions of structural integrity and outward appearance of the assembly to be addressed separately, resulting in a more fully integrated appearance in which the two-component construction of the assembly is fully concealed, such that a substantial reduction in manufacturing costs is achieved due to the reduced functional demands on the wheel.

9 Claims, 3 Drawing Sheets

WHEEL AND OVERLAY ASSEMBLY

This application is a CIP of Ser. No. 08/631,178 filed Apr. 12, 1996 abandoned.

BACKGROUND OF THE INVENTION

1. Field of the Invention

The present invention generally relates to automobile wheels equipped with decorative overlays. More specifically, this invention relates to a wheel and overlay assembly, in which the overlay is configured to define essentially the entire external appearance of the assembly, including the size and shape of turbine openings formed in the wheel, to the extent that a single inexpensive wheel style can be adapted to accept multiple overlay configurations in order to achieve widely varying styling effects for use on different passenger vehicles.

2. Description of the Prior Art

Decorative overlays are widely used in the automotive industry to enhance the aesthetic appearance of wheels on passenger vehicles, including unadorned steel wheels and cast aluminum wheels, the latter being difficult and very cost ineffective to plate with chromium. Together, a wheel and its overlay determine the wheel assembly's structural integrity and the aesthetic outward appearance, both of which are necessary for successful application in the passenger vehicle industry. Traditionally, wheel and overlay assemblies generally have divided the functions of structural integrity and aesthetic appearance, such that each is addressed separately by either the wheel or the overlay. The wheel contributes the structural integrity, while the overlay covers a portion of the outboard surface of the wheel in order to contribute to the wheel's aesthetic appearance.

By addressing each issue separately, the resulting wheel and overlay assemblies are able to achieve a significant reduction in the overall cost of the wheel, since the structural and aesthetic functions of the assembly can be addressed more effectively than would be possible if one single member was used to achieve both goals. To achieve this advantage, overlays of the prior art have often been attached using an in-situ molding technique. Primarily, the in-situ molding of such overlays adhesively attaches the overlay to a wheel with a low density polymeric foaming material with inherent adhesive characteristics, as opposed to more traditional wheel covers that require mechanical attachment devices such as clips, fasteners and the like. In-situ molding processes also generally provide both noise reduction and an impact-resistant outer covering that protects the underlying wheel.

Examples of prior art patents directed to in-situ molding processes include U.S. Pat. Nos. 4,976,497 and 5,128,085 to Post et al. The methods disclosed by Post et al. necessitate the use of a wheel as one-half of a mold into which the foaming material is injected, such that the entire inboard surface of the overlay contacts the outboard face of the wheel and strictly conforms to the contours and structure of the wheel. To reduce the weight-to-volume ratio of an overlay whose outboard surface does not closely conform to that of its wheel, Post et al. teach the use of weight reducing molding inserts selectively placed in those regions where the gap between the outboard surfaces of the overlay and wheel are greatest. Furthermore, the method of Post et al. involves the use of a lower molding part on which the wheel is placed prior to the molding operation. The lower molding part is shown as having raised portions that extend through the turbine openings in the wheel, such that tapered openings in the overlays are formed at the turbine openings.

Significant drawbacks exist with in-situ molding processes of the type taught by Post et al. For example, the use of molding inserts complicates the molding operation and contributes additional cost to the manufacture of a wheel and overlay assembly. In addition, because of the in-situ molding process, the wheel to which the overlay is to be mounted must be transported, stored and used at the molding station, which greatly complicates the molding operation and the economics associated therewith. Furthermore, the in-situ process dictates that the inboard peripheral shapes of the tapered openings in the overlay be strictly limited to the exact shape of the turbine openings in the wheel in order to contain the foaming material as it is being injected into the mold. Consequently, the turbine openings of the wheel influence to a significant degree the overall appearance of the wheel, because the shape and number of turbine openings in the wheel dictate the shape and number of openings of the complementary overlay when molded in-situ.

Accordingly, while the use of a wheel as a molding tool member allows for a customized fit of an overlay to the wheel, such molding methods substantially limit the ability of an overlay to be molded to have substantially different designs than the underlying wheel. For instance, an overlay molded in-situ cannot be formed to have its inboard surface axially spaced from the outboard surface of the wheel since the interface between the molded material and outboard surface of the wheel is relied upon to adhesively attach the overlay to the wheel. Similarly, for the same reasons, the in-situ molding process does not permit an overlay to significantly alter the shape and number of turbine openings in the wheel and overlay assembly, and therefore the in-situ process presents some limitations concerning the ability of the assembly to have a configuration substantially different from that of the wheel. Particularly in the passenger vehicle industry where the appearance of the overlay is of extreme importance, such design limitations are significant drawbacks.

Consequently, use of an in-situ molding process necessarily requires the use of a large number of wheels whose styling and construction differ considerably in order to provide for different outward appearances. Since the cost of retooling production facilities for the wheel portion of each new wheel and overlay assembly is approximately about five to about eight times the cost of retooling the overlay portion, retooling only the overlay portion for each new design rather than both the overlay and wheel would significantly reduce the cost of producing overlay and wheel assemblies. Furthermore, because the outward appearance is likely to vary more often than the structural configuration of the wheel, it would be desirable if the overlay could have a greater influence on the outward appearance of a wheel and overlay assembly, such that a single standardized wheel design could be employed to achieve widely varying styling appearances.

Accordingly, what is needed is a wheel and overlay assembly in which the overlay is formed to have significantly different contours from that of the underlying wheel. The underlying wheel's construction would take into account only the structural integrity necessary for its various applications. That is, one standardized or generic wheel design would serve a number of different vehicle applications with the ultimate objective being one standard wheel for each standard rim size; this, significantly reduces the cost per vehicle yet provides the function of structural integrity. In particular, the overlay of such a wheel and overlay assembly would be required to have portions that significantly alter the outboard contour features as well as the shape of the turbine openings of the wheel, if necessary, and possibly the number of turbine openings visible on the outboard surface of the assembly, such that the configuration of the underlying standard wheel is substantially masked by the overlay and only the aesthetic features of the cover are associated with the specific model of the vehicle on which the overlay is used. In this manner, the overlay would fully define the external appearance of the wheel and overlay assembly, rather than being limited to the outward appearance of the underlying wheel. As such, wheel and overlay assemblies could be produced having drastically different appearances by modifying only the overlay, rather than necessitating a completely new wheel design for each specific vehicle model.

SUMMARY OF THE INVENTION

According to the present invention there is provided a standardized wheel intended to be used on a number of different vehicles and an overlay assembly employing an overlay configured to more fully control the aesthetic appearance of the assembly. More particularly, the standardized wheel and overlay assembly of this invention employs an overlay that more completely establishes the decorative appearance of the assembly, thereby enabling the use of a standardized wheel whose design and construction considerations are based solely on the structural requirements of the vehicle assembly. As such, the overlay is adapted to enable the functions of structural integrity and outward appearance of the assembly to be addressed separately, resulting in a wheel and overlay assembly having a more fully integrated appearance in which the two-component construction of the assembly is fully concealed, such that a substantial reduction in manufacturing costs is achieved due to the reduced functional demands on the wheel.

The wheel and overlay assembly of this invention generally includes a standardized wheel with a disk circumscribed by a rim. The disk defines an outboard surface of the wheel through which openings, often termed turbine openings, are formed to assist in brake cooling while also reducing the weight of the wheel. The overlay of the assembly is formed entirely separately from the wheel such that, other than the diameter of the wheel, the configuration of the overlay is not strictly dictated by the outboard surface of the standardized wheel. Since the overlay is manufactured separately from the wheel, a much greater diversity in the styling of the overlay can be achieved as compared to overlays of the type molded in-situ on a wheel. The overlay is permanently secured to the wheel with an adhesive, and covers the entire outboard surface of the wheel so as to determine the aesthetic appearance of the assembly and serve functional requirements as necessary, i.e., turbine openings for brake cooling. In particular, the overlay is configured to more completely establish the decorative appearance of the assembly, to the extent that the wheel can have a standardized design yet can be mated with any one of a multitude of differently-styled overlays of this invention to achieve a wide variety of styling effects and thereby serve a wide variety of vehicle applications.

To achieve the above, overlays in accordance with this invention must be capable of being mounted to a single standardized wheel configuration, even though each overlay has a unique styling appearance that drastically alters its shape, both in the contours of its outboard surface and the placement and shape of turbine openings formed therein that communicate with turbine openings of the wheel as necessary. In so doing, the inboard surface of an overlay in accordance with this invention is generally adapted to have regions that are axially spaced apart from the outboard surface of the wheel. Furthermore, because the turbine openings in the wheel would otherwise dictate the outward appearance of the assembly, the turbine openings of the overlay must also be configured to have a different peripheral shape, and potentially even differ in number, than the turbine openings in the wheel. For this purpose, each turbine opening of an overlay configured in accordance with this invention is defined by a portion of the overlay that radially extends into or through a complementary one of the wheel's turbine openings, enabling the overlay to completely conceal the placement, size and peripheral shape of the wheel's turbine openings and thereby provide significantly different aesthetic styling effects.

From the above, it can be seen that a significant advantage of the present invention is that overlays of this invention are capable of an infinite variety of styles, yet are compatible with the use of a single standardized wheel design. In particular, overlays of this invention are capable of having outboard contours that differ greatly from that of a standardized wheel, while remaining securable to the standardized wheel in a manner that completely masks the appearance of the wheel's outboard surface. Consequently, this invention makes possible the use of a single standardized wheel design that is configured to optimize the structural requirements of the vehicle assembly, yet can be equipped with any one of a multitude of differently-styled overlays to achieve a particular styling effect for various vehicle applications. As such, the retooling costs for manufacturing a new wheel assembly are significantly reduced because only the overlay needs to be modified and not the underlying standardized wheel, thereby avoiding the requirement to extensively test a new wheel design. To fully achieve the advantages of this invention, each overlay capable of being secured to the same standardized wheel is configured to fully conceal the two-piece construction of the assembly in order to enhance the perceived value of the wheel assembly.

In addition, overlays in accordance with this invention also preferably achieve other advantages associated with wheel and overlay assemblies. For example, overlays of this invention also preferably promote noise abatement, allow for cooling of the wheel and its brake through the turbine openings as well as selective placement of an adhesive which attaches the overlay to the wheel, and prevent intrusion of contaminants between the wheel and overlay.

Accordingly, it is an object of the present invention to provide an automotive wheel and overlay assembly, in which the assembly has a two-piece construction that is concealed by an overlay formed separately from the wheel.

It is another object of the invention that the overlay be configured to be capable of a wide variety of styles, shapes and contours, yet remain compatible to a single standardized wheel design which is adaptable to a variety of vehicles using the same rim size.

It is still another object of the invention to provide a multitude of differently-styled overlays, each of which can be secured to a standardized wheel in order to achieve a high degree of styling flexibility for various vehicle applications with the use of a single wheel construction.

It is a further object of the invention that each of the overlays be characterized by portions that extend into turbine openings formed in the standardized wheel in a manner that alters the size and shape of the openings and thereby its styling effect, so as to promote the styling impact of the overlay on the overall appearance of the wheel and overlay assembly used on the vehicle.

Other objects and advantages of this invention will be more apparent after a reading of the following detailed description taken in conjunction with the drawings provided.

DETAILED DESCRIPTION OF THE PREFERRED EMBODIMENT

Figure 1:
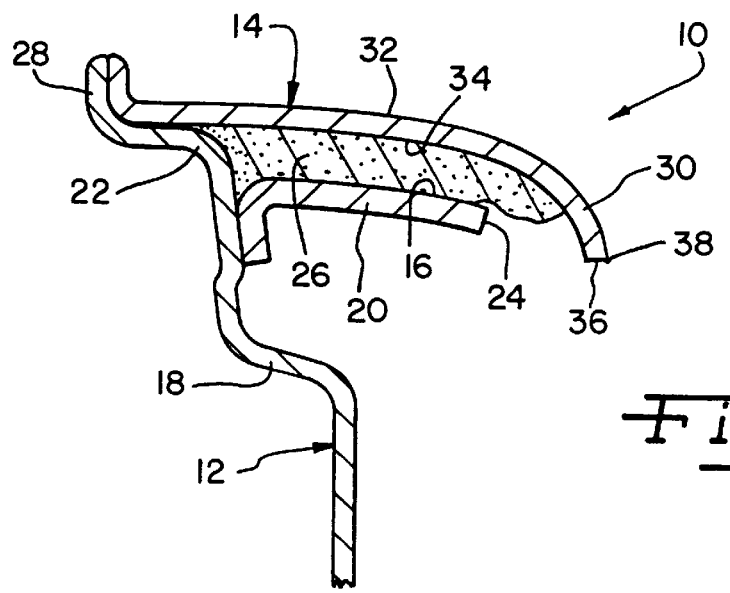
FIG. 1 shows in cross section a rim portion of an automotive wheel to which is attached an overlay in accordance with this invention.

With reference to FIGS. 1 through 7, there are shown different embodiments of a wheel and overlay assembly 10 for use on passenger vehicles in accordance with the teachings of this invention. The wheel and overlay assembly 10 has a two-piece construction, in which an overlay 14 of the type formed separately from a standardized wheel 12 is attached to an outboard surface 16 or 16' of the wheel 12. The wheel 12 can be formed from any suitable material, such as aluminum or steel, as is conventional in the automotive industry. The overlay 14 can be constructed of plastic, aluminum, plated steel, stainless steel or bimetal, as may be preferred or dictated by the design constraints of the particular application. In accordance with this invention, the wheel and overlay assemblies 10 shown in FIGS. 1 through 7 share the common feature of the overlay 14 extending to the outer diameter regions of the wheel 12 or the wheel rim as defined by a flange lip 28 in order to more fully conceal the outboard surface 16 or 16' of the underlying standardized wheel 12 and thereby maximize the aesthetic effect of the overlay 14. However, it is foreseeable that the overlay 14 of this invention could be limited to cover only a portion of the outboard surface 16 or 16'.

A first embodiment of the invention is illustrated in FIG. 1 as a cross section of a rim portion of the wheel and overlay assembly 10. The portion shown portrays the wheel 12 as including a rim 18 circumscribing a disk 20 or 20' or spider which has been structurally optimized to be used on a plurality of different vehicles. Together, the rim 18 and disk 20 or 20' form the outboard surface 16 or 16' of the wheel 12. As is conventional, the disk 20 includes openings (a single opening 24 being shown in the Figures) that vent the interior of the wheel 12 in order to achieve adequate cooling of the wheel 12 and its associated brake (not shown). The rim 18 includes a flange 22 generally extending in a radially outward direction from the wheel 12, and then terminating with the flange lip 28 that extends from the flange 18 in an axial direction. As a result, the flange lip 28 forms a radially inward surface that is roughly perpendicular to the outboard surface 16 of the wheel 12.

The overlay 14 has inboard and outboard surfaces 34 and 32, respectively, that are separated from the disk 20 or 20' and the outboard surface 16 or 16'. The invention contemplates that the relationship of the overlay's outboard surface to the standardized wheel disk and its associated spider is a direct function of the aesthetic features representative of the distinctive characteristics of the vehicle model on which the overlay will be used. As shown, the inboard surface 34 of the overlay 14 is spaced apart from the outboard surface 16 or 16' of the wheel 12, such that the thickness of the overlay 14 is substantially thinner than would be possible with an in-situ molded overlay capable of achieving a similar appearance for its outboard surface. In addition, the overlay 14 is shown as including an axial portion 30 that axially extends into the opening 24 in the standardized wheel disk 20 or 20'. The axial portion 30 of the overlay 14 terminates in a lip 36 that is spaced apart from the periphery of the opening 24 in the disk 20 or 20', such that the axial portion 30 of the overlay 14 forms a turbine opening 38 that communicates with the opening 24 in the wheel 12, and therefore serves as a passage for ventilation air flow to the interior of the wheel 12. In this manner, the overlay 14 of this invention differs significantly from prior art in-situ molded overlays, whose turbine opening-forming portions present limited flexibility since it is necessary to ensure that a completely enclosed mold cavity for the overlay is formed because of the in-situ molding process. Further, since the adhesive is contained within the foaming material used to mold the overlay, considerations must be made to ensure that the foaming material and outboard surface of the wheel have a significant interface in order to adhesively attach the overlay to the wheel. This specific feature allows the designer to establish unique turbine openings characteristic for the specific vehicle rather than be constricted by the specific turbine opening in the spider or disk 20 or 20' of the standardized wheel.

According to this invention, the number, shape and location of the turbine openings 38 in the overlay 14 can be chosen in light of the aesthetic characteristics desired for the wheel and overlay assembly 10 used on a specific vehicle. More specifically, the lip 36 of the axial portion 30 need not conform to the opening 24 in the disk 20 or 20', but instead can be spaced away from the opening 24 in both the axial and radial direction of the wheel 12. This aspect substantially increases the variability of the overlay 14 than was possible with in-situ molding. For example, turbine openings of an overlay molded in-situ have certain limitations due to the size and shape of the openings 24 in the wheel because the wheel 12 forms part of the mold in which the overlay is formed, and therefore the foaming material must be prevented from escaping from the mold as it is being injected. In contrast, the overlay 14 of this design is not molded in-situ, and uses the axial portion 30 to determine the appearance of the turbine opening 38, including its shape, size and, under appropriate circumstances, location. With this approach, it is foreseeable that the number of turbine openings 38 can exceed the number of openings 24 in the wheel 12 if the openings 24 are adequately sized to accommodate more than one axial portion 30 of the overlay 14.

Not only does the overlay 14 of this invention achieve greater design flexibility with respect to the turbine openings 38, but the outboard surface 32 of the overlay 14 may also be spaced a significant distance away from the outboard surface 16 of the wheel 12 in a manner not possible with overlays produced by the in-situ molding process without the use of considerably greater amounts of material to form the overlay. As illustrated in FIG. 1, a void existing between the overlay 14 and the outboard surface 16 of the wheel 12 is substantially filled with an adhesive or foam filler 26, including foaming adhesives known in the art. Filling of this void between the overlay 14 and wheel 12 is desirable because it promotes the ability of the overlay 14 to abate noise produced by the wheel 12 and its associated brake as well as prevent water or mud entrapment areas. A foaming adhesive serves to fill this void while also securely attaching the overlay 14 to the wheel 12, regardless of how far the overlay 14 is spaced from the outboard surface 16 of the wheel 12, or the degree to which the inboard surface 34 of the overlay 14 is contoured, including the axial portion 30 of the overlay 14. As such, FIG. 1 shows the axial portion 30 as being securely attached to the wheel 12 by a full face adhesive, even though spaced apart from the opening 24, such that water and other debris are prevented from becoming trapped between the overlay 14 and wheel 12. The invention further contemplates selective application of an adhesive to provide cooling and/or heat insulating portions which can effectively be used to contribute to the curing of the adhesive during the manufacturing cycle or to provide an air flow to carry away heat generated by the application of the brakes.

From the above, it can be seen that the overlay 14 of this invention is capable of an infinite variety of styles, based on the outward appearance of the overlay 14, yet will remain compatible with the wheel 12 as long as the peripheral areas of the overlay 14 and wheel 12 adequately match and the axial portions 30 of the overlay 14 are appropriately received within the openings 24 of the disk 20 or 20'. The outboard surface 32 of the overlay 14 may have contours that differ greatly from that of the wheel 12, while remaining securable to the wheel 12 in a manner that completely masks the appearance of the wheel's outboard surface 16. Consequently, the overlay 14 allows the use of a single standardized design for the wheel 12, such that the wheel 12 can be designed to more fully optimize the structural requirements of the assembly 10 as well as to adapt it for use on several different vehicles. Moreover, the standardized wheel 12 can be equipped with any one of a multitude of differently-styled overlays 14 to achieve a particular styling effect and allow the standardized wheel to be used on a variety of vehicle body styles. As such, the retooling costs for manufacturing a new wheel and overlay assembly 10 of this invention are significantly reduced because only the overlay 14 needs to be modified to achieve a new styling effect for the particular application of the assembly 10.

Figure 2:
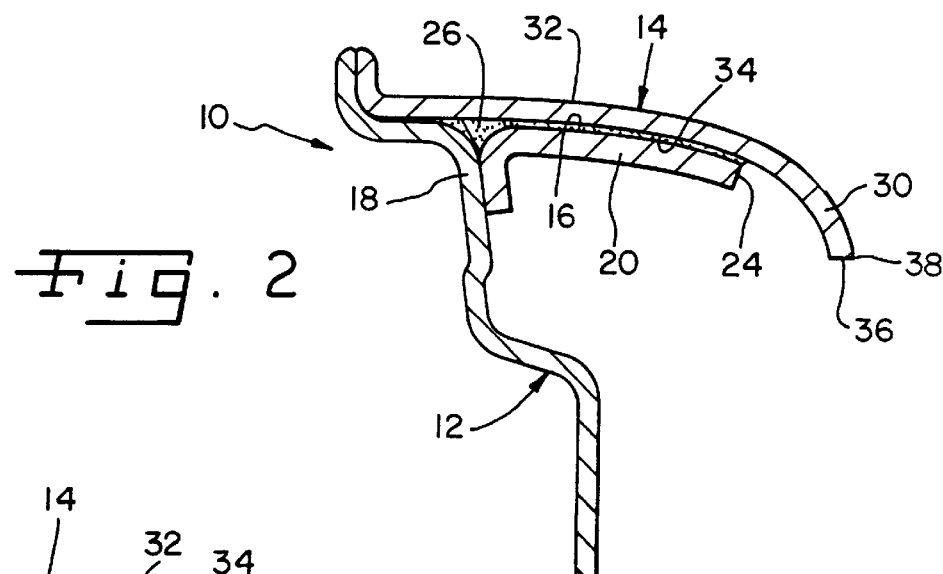
FIGS. 2 through 7 represent alternative configurations for the overlay of FIG. 1.

In a second embodiment, FIG. 2 shows a similar overlay 14 as represented in FIG. 1, but with a substantial portion of the overlay 14 abutting the outboard surface 16 of the standardized wheel 12. FIG. 2 also shows the lip 36 of the axial portion 30 extending substantially further through the opening 24 in the disk 20. In contrast with the embodiment of FIG. 1, substantially less adhesive 26 is required to attach the overlay 14 to the wheel 12.

Figure 3:
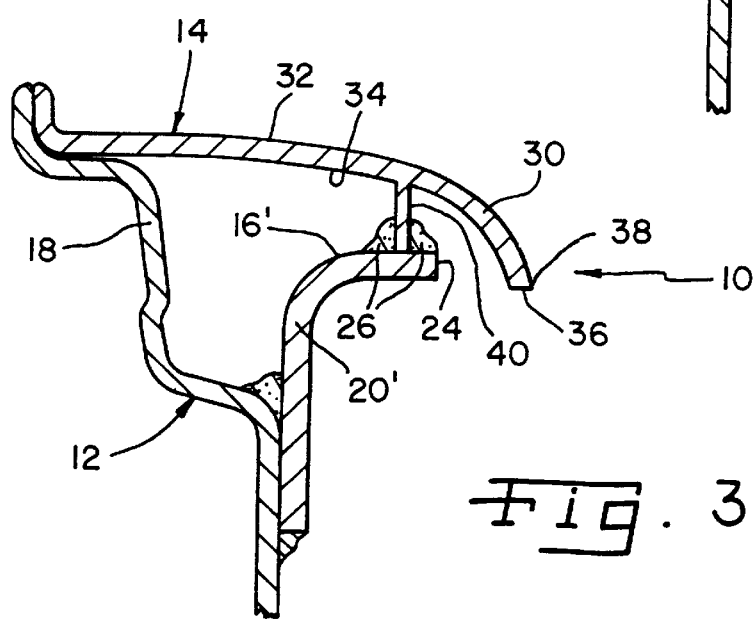

A third embodiment of this invention is represented by FIG. 3, which shows the overlay 14 as including a rib 40 that supports the overlay 14 in the vicinity of the opening 24 in the disk 20'. FIG. 3 also shows the limited use of adhesive 26 around the rib 40, and therefore uniquely allows for support of the overlay 14 while substantially reducing the amount of adhesive 26 required to bond the overlay 14 to the wheel 12. Therefore, rather than filling the void between the wheel 12 and the overlay 14 with filler material or adhesive, the void is sealed to avoid water or mud entrapment and the associated balancing problem. The axial placement of the overlay 14 relative to the outboard surface 16' of the wheel 12 is determined by one or more ribs.

Figure 4:
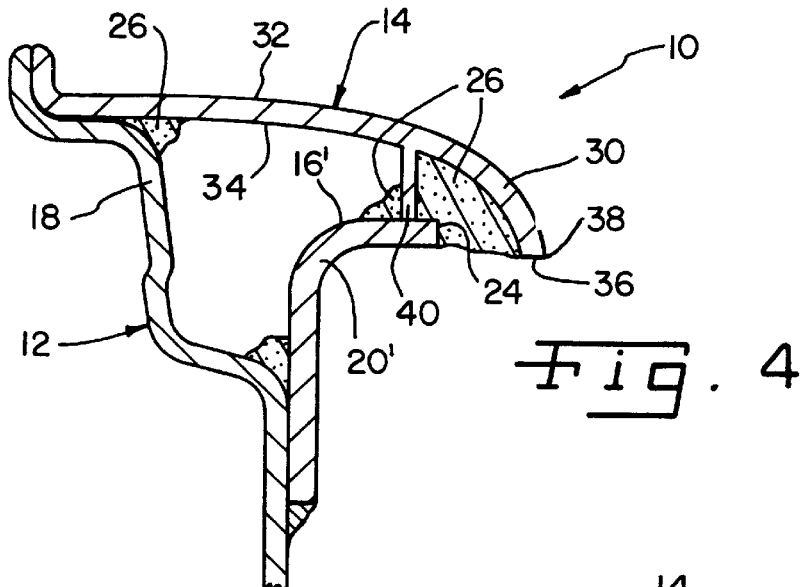

FIG. 4 illustrates the use of a greater amount of adhesive 26 in a manner that prevents the entrapment of water and debris between the overlay 14 and wheel 12 in the vicinity of the turbine opening 38. The adhesive fills the area bounded by the inboard surface 34 of the overlay 14, the radially inward surface of the rib 40, and the outboard surface 16' of the wheel 12.

Figure 5:
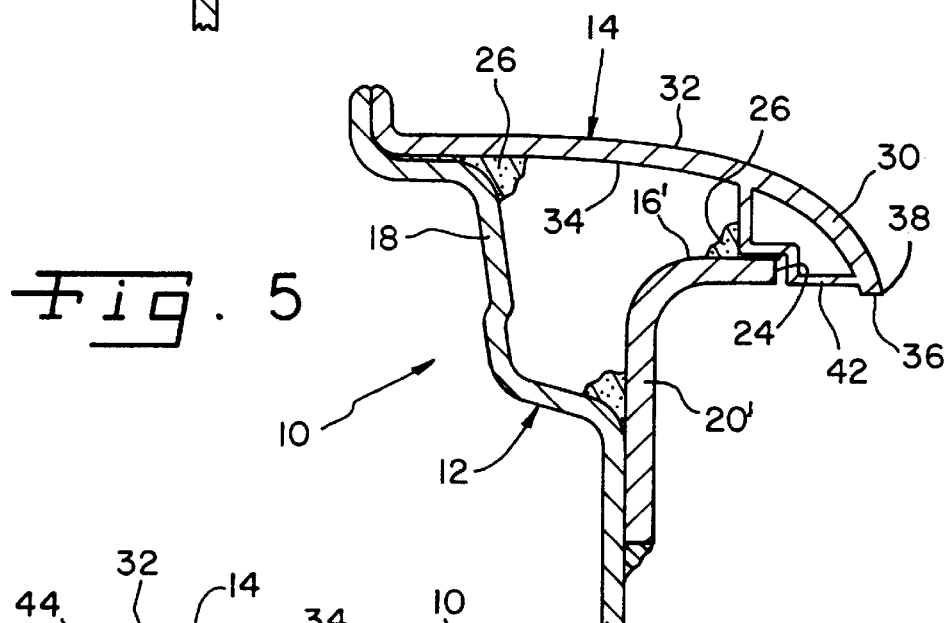

FIG. 5 illustrates yet another embodiment capable of excluding water and debris from between the overlay 14 and wheel 12 without relying on additional adhesive or filler material. In particular, the overlay 14 is shown as including an integrally-formed gas-assist molded hollow member 42 that provides support to a degree not possible with the rib 40 of FIGS. 3 and 4. In some applications, the use of the molded hollow member 42 may be desirable, particularly if a reduced amount of adhesive or filler is necessary or if application of the filler or adhesive is difficult. As shown in FIG. 5, the molded hollow member 42 is configured to include a portion that extends into the opening 24 in the disk 20 and abuts the outboard surface 16 of the wheel surrounding the opening 24, such that the overlay 14 is located and stabilized relative to the wheel 12 in both the axial and radial directions. Because the overlay 14 of this invention is formed separately from the wheel 12, the molded hollow 42 is advantageously able to radially locate the overlay 14 relative to the wheel 12 during assembly.

Figure 6:
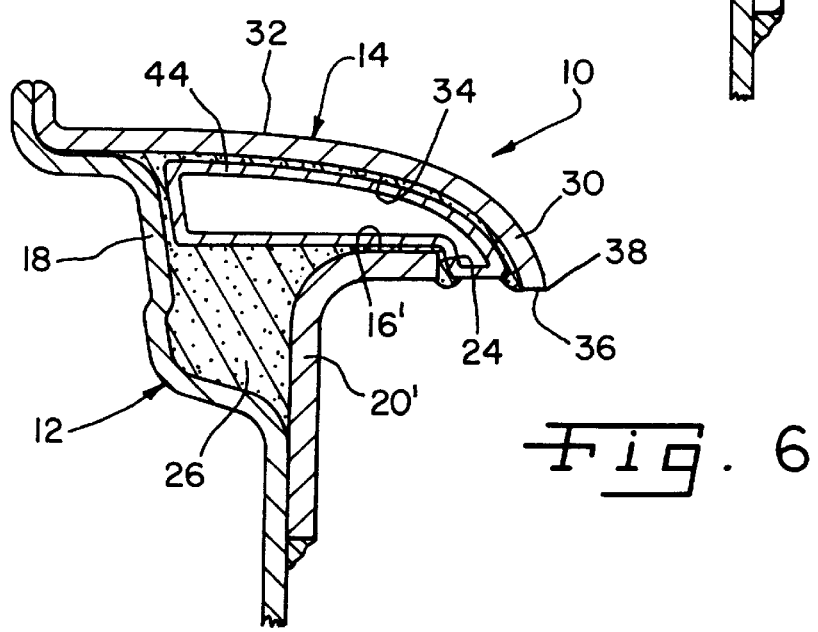
Figure 7:
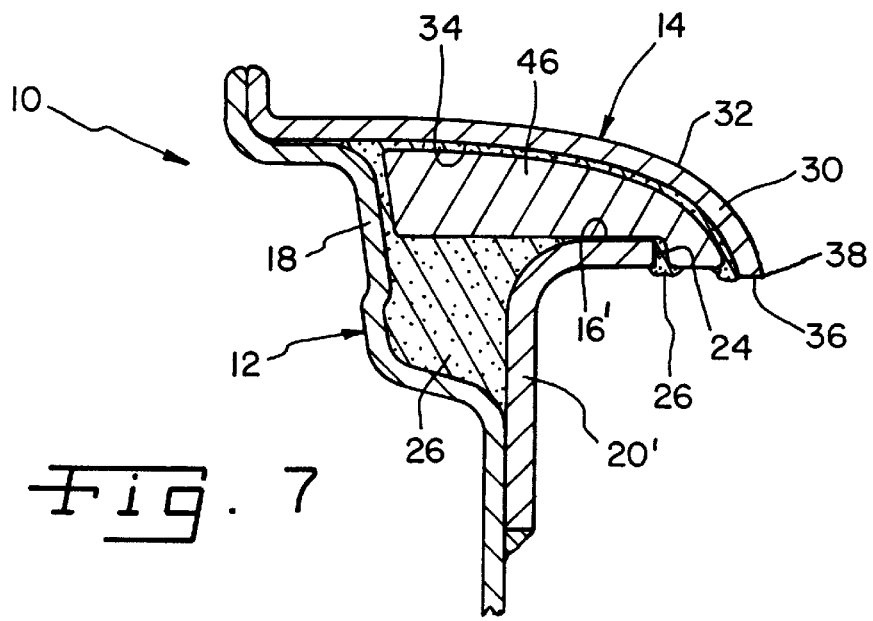
Figure 8:
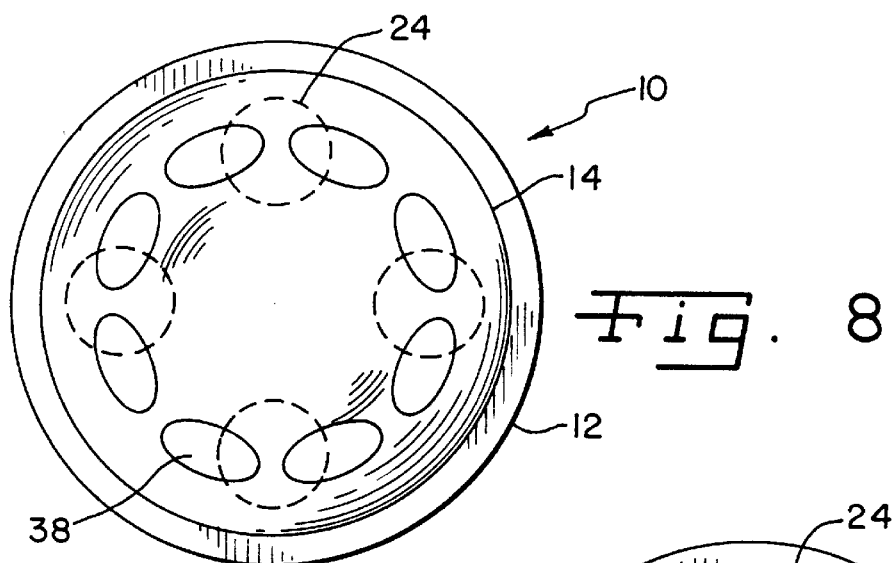
FIG. 8 is a side view of the wheel and overlay which shows an embodiment in which the turbine openings in the wheel differ in number from the turbine openings in the overlay.
Figure 9:
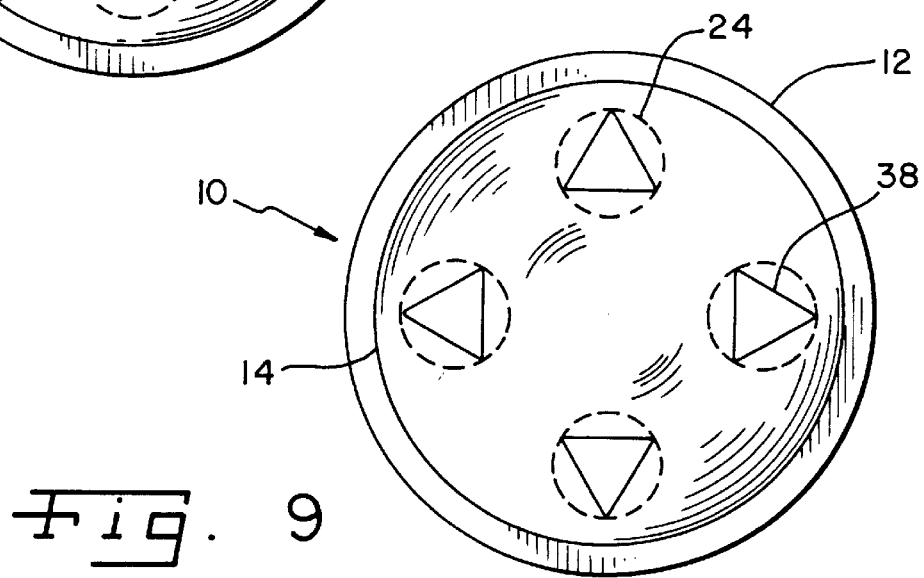
FIG. 9 is a side view of the wheel and overlay which shows an embodiment in which the turbine openings of the wheel are a different peripheral shape than the turbine openings of the overlay.

Finally, in two additional embodiments shown in FIGS. 6 and 7, a separate member is sandwiched between the overlay 14 and the outboard surface 16 of the wheel 12 to fill the gap between the axial portion 30 of the overlay 14 and the opening 24 in the disk 20'. In FIG. 6, the overlay 14 is shown as including a separately-formed blow-molded member 44 that substantially fills the void between the overlay 14 and wheel 12, thereby minimizing the amount of adhesive and/or filler 26 required to secure the overlay 14 to the wheel 12 when the overlay 14 is axially spaced apart from the outboard surface 16' of the wheel 12. Similarly, FIG. 7 illustrates the use of a separately-formed foamed member 46 between the overlay 14 and wheel 12. As with the embodiment of FIG. 5, the members 44 and 46 are each shown to include a portion extending into the opening 24 in the disk 20' and, in FIG. 7, directly abutting the outboard the opening 24, while in FIG. 6 indirectly abutting through the adhesive and/or filler 26, such that the overlay 14 is stabilized relative to the wheel 12 in both the axial and radial directions. In addition, the members 44 and 46 are also shown as being sized and contoured to radially locate the overlay 14 relative to the wheel 12 during assembly.

In view of the above, it can be seen that the present invention provides a novel wheel and overlay assembly 10 that enables the use of a standardized wheel design to achieve an essentially infinite number of styling configurations through the use of an overlay 14 that more fully determines the outward appearance of the assembly 10, such that a noticeable enhancement can be achieved in the overlay's decorative effect. Simultaneously, the cost of wheel production is substantially reduced since the invention provides for a multitude of differently-styled overlays to be securely attached to the same standardized wheel design which may be used for a variety of vehicle applications. To achieve this flexibility in design of the overlay 14, the embodiments of the invention illustrate the overlay 14 as including axial portions 30 that determine the shape or number of the turbine openings 38 in the assembly 10, while also enabling the overlay 14 to be spaced apart from the outboard surface 16 or 16' of the wheel 12 in order to provide visible surface contours that differ from those present on the wheel 12.

Consequently, the role of the wheel 12 in the assembly 10 is almost completely focused on the structural requirements of the assembly 10, while the overlay 14 substantially masks the appearance of the wheel 12 in order to maximize the aesthetic effect of the standardized wheel and overlay assembly 10. The result is a standardized wheel and overlay assembly 10 whose appearance is dominated by the overlay 14 and whose two-piece construction is more fully concealed. As such, the perceived value of the wheel and overlay assembly 10 is greatly enhanced.

Another significant advantage is that the wheel and overlay assembly 10 utilizes an overlay 14 of the type formed separately from the wheel 12 to which it is mounted, such that manufacturing and assembly are facilitated. In particular, the overlay 14 is preferably a solid panel member that can be bonded to the outboard surface 16 or 16' of an aluminum or steel wheel 12 with a suitable adhesive or filler material. Any void between the inboard surface 34 of the overlay 14 and the outboard surface 16 of the wheel 12 can be completely or partially filled with an adhesive, filler, integrally-formed feature of the overlay 14, or separately-formed member.

While the invention has been described in terms of preferred embodiments, it is apparent that other forms could be adopted by one skilled in the art. Accordingly, the scope of the invention is to be limited only by the following claims.

What is claimed is:

1. A wheel and overlay assembly comprising:

a wheel having a standardized disk and a rim flange circumscribing said standardized disk, said standardized disk and rim flange having an outboard surface with said rim flange at an outer peripheral region thereof, said outboard surface of said wheel having a first plurality of turbine openings, each of said first plurality of turbine openings having a predetermined peripheral shape defined by the structural integrity of said wheel;

an overlay covering a least a portion of said outboard surface, said overlay having:

an inboard surface facing said outboard surface of said wheel;

an outboard surface opposite said inboard surface, at least a portion of said inboard surface being spaced apart from said outboard surface of said wheel to define at least one void therebetween;

a plurality of predetermined contours on said outboard surface opposite said inboard surface, said plurality of predetermined contours adapted to provide a predetermined aesthetic characteristic on a particular vehicle; and a second plurality of turbine openings in said overlay, at least one of said second plurality of turbine openings in said overlay being at least partially complementary to one of said first plurality of turbine openings in said outboard surface of said wheel so as to communicate with said one of said first plurality of turbine openings in said outboard surface of said wheel, at least one of said second plurality of turbine openings in said overlay being defined by a portion of said overlay extending peripherally into a complementary one of said first plurality of turbine openings in said outboard surface of said wheel so as to redefine said predetermined peripheral shape of said complementary one of said first plurality of turbine openings in said outboard surface of said wheel;

a rib member disposed between said outboard surface of said wheel and said inboard surface of said overlay, said rib member having one end portion abutting said outboard surface of said wheel and spaced from at least one of said first plurality of turbine openings in said wheel such that said overlay is stabilized relative to said wheel in an axial direction of said wheel; and means for attaching said overlay to said wheel such that said second plurality of turbine openings in said overlay define a different peripheral shape from said predetermined peripheral shape of said first plurality of turbine openings in said outboard surface of said wheel, to define said aesthetic predetermined characteristics of said particular vehicle.

2. A wheel and overlay assembly as claimed in claim 1 wherein said rib member extends into said at least one of said first plurality of turbine openings in said outboard surface of said wheel so as to radially locate said overlay relative to said wheel.

3. A wheel and overlay assembly comprising:

a wheel having a standardized disk and a rim flange circumscribing said standardized disk, said standardized disk and rim flange having an outboard surface with said rim flange at an outer peripheral region thereof, said outboard surface of said wheel having a first plurality of turbine openings, each of said first plurality of turbine openings having a predetermined peripheral shape defined by the structural integrity of said wheel;

an overlay covering at least a portion of said outboard surface, said overlay having:

an inboard surface facing said outboard surface of said disk;

an outboard surface opposite said inboard surface, at least a portion of said inboard surface being spaced apart from said outboard surface of said wheel to define at least one void therebetween;

a plurality of predetermined contours on said outboard surface opposite said inboard surface, said plurality of predetermined contours adapted to provide a predetermined aesthetic characteristic on a particular vehicle; and a second plurality of turbine openings, said second plurality of turbine openings of said overlay being positioned with respect to said first plurality of turbine openings of said outboard surface of said wheel, so as to redefine said predetermined peripheral shape of each of said first plurality of turbine openings of said outboard surface of said wheel;

a rib member disposed between said overlay and said outboard surface of said wheel, said rib member having an expanded portion bridging said at least one void such that said overlay is stabilized relative to said wheel in both axial and radial directions of said wheel; and means for attaching said overlay to said wheel such that said second plurality of turbine openings in said overlay define a different peripheral shape from said predetermined peripheral shape of said first plurality of turbine openings in said, outboard surface of said wheel to enhance said predetermined aesthetic characteristics of said particular vehicle.

4. A wheel and overlay assembly as claimed in claim 3 wherein a portion of said expanded portion of said rib member extends into said at least one of said first plurality of turbine openings in said outboard surface of said wheel so as to radially locate said overlay relative to said wheel.

5. A method of manufacturing a wheel and overlay assembly comprising the steps of:

providing a wheel having a disk and a rim flange circumscribing said disk, said disk and rim flange defining an outboard surface of said wheel and a first plurality of turbine openings therein, each of said first plurality of turbine openings having a defined peripheral shape;

forming an overlay separately from said wheel, said overlay having an inboard surface and a second plurality of turbine openings therethrough, each of said second plurality of turbine openings in said overlay being defined by a peripherally extending portion of said overlay;

radially and axially stabilizing said overlay relative to said wheel by forming a seperate member between said inboard surface of said overlay and said outboard surface of said disk and rim flange such that said overlay is stabilized relative to said wheel in both axial and radial directions of said wheel; and attaching said overlay to said wheel such that said overlay covers at least a portion of said outboard surface of said disk and said rim flange, said inboard surface of said overlay facing said outboard surface of said disk and rim flange, at least a portion of said inboard surface being spaced apart from said outboard surface of said disk and rim flange, and at least one of said second plurality of turbine openings in said overlay being at least partially complementary to one of said first plurality of turbine openings in said outboard surface of said wheel so as to communicate with said one of said first plurality of turbine openings in said outboard surface of said wheel, said peripherally extending portion projecting into said one of said first plurality of turbine openings in said outboard surface of said wheel.

6. A method as claimed in claim 5 further comprising the step of inserting said separately-formed member between said overlay and said disk prior to said attaching step, such that said separately-formed member extends into at least one of said first plurality of turbine openings in said outboard surface of said wheel during said attaching step so as to radially locate said overlay relative to said wheel.

7. A method as claimed in claim 5 wherein said step of forming said overlay further comprises integrally forming a plurality of ribs extending from said inboard surface of said overlay in an axial direction, said plurality of ribs being abutted against said outboard surface of said wheel during said attaching step so as to space said inboard surface of said overlay apart from said outboard surface of said wheel.

8. A method as claimed in claim 7 further comprising the step of inserting a filler material between said plurality of ribs extending from said inboard surface of said overlay and said one of said second plurality of turbine openings.

9. A wheel and overlay assembly comprising:

a wheel having a standardized disk and a rim flange circumscribing said standardized disk, said standardized disk and rim flange having an outboard surface with said rim flange at an outer peripheral region thereof, said outboard surface of said wheel having a first plurality of turbine openings, each of said first plurality of turbine openings having a predetermined peripheral shape defined by the structural integrity of said wheel;

an overlay covering at least a portion of said outboard surface, said overlay having:

an inboard surface facing said outboard surface of said wheel;

an outboard surface opposite said inboard surface, at least a portion of said inboard surface being spaced apart from said outboard surface of said wheel;

a plurality of predetermined contours on said outboard surface opposite said inboard surface, said plurality of predetermined contours adapted to provide a predetermined aesthetic characteristic on a particular vehicle;

a second plurality of turbine openings in said overlay, said second plurality of turbine openings of said overlay being positioned with respect to said first plurality of turbine openings of said outboard surface of said wheel so as to redefine said predetermined peripheral shape of each of said first plurality of turbine openings of said outboard surface of said wheel;

at least one of said second plurality of turbine openings in said overlay being at least partially complementary to one of said first plurality of turbine openings in said outboard surface of said wheel so as to communicate with said one of said first plurality of turbine openings in said outboard surface of said wheel; and at least one of said second plurality of turbine openings in said overlay being defined by a portion of said overlay extending peripherally into a complementary one of said first plurality of turbine openings in said outboard surface of said wheel so as to redefine said predetermined peripheral shape of said complementary one of said first plurality of turbine openings in said outboard surface of said wheel;

a plurality of rib members disposed between said inboard surface of said overlay and said outboard surface of said wheel so as to space a portion of said inboard surface of said overlay apart from said outboard surface of said wheel; and means for attaching said overlay to said wheel such that said second plurality of turbine openings in said overlay define a different peripheral shape from said predetermined peripheral shape of said first plurality of turbine openings in said outboard surface of said wheel to define said predetermined aesthetic characteristics of said particular vehicle.

* * * * *

UNITED STATES PATENT AND TRADEMARK OFFICE
CERTIFICATE OF CORRECTION

PATENT NO. : 6,082,829
DATED : July 4, 2000
INVENTOR(S) : Lee A. Chase

It is certified that error appears in the above-identified patent and that said Letters Patent is hereby corrected as shown below:

Column 1,
Line 3, delete "CIP" and insert -- continuation --.
Line 40, delete "of ten" and insert -- often --.

Column 2,
Line 63, delete the comma -- , --.

Column 5,
Line 9, delete "and".
Line 11, delete the period "." and insert a semi-colon -- ; --.
Line 59, delete "18" and insert -- 22 --.

Column 8,
Line 17, delete "16" and insert -- 16' --.
Line 21, after "hollow" insert -- member --.
Line 39, after "outboard" insert -- surface 16' of the wheel surrounding --.

Column 9,
Line 36, delete "a" and insert -- at --.
Lines 39, 41, 45, and 50, indent paragraphs to indicate "subelements" rather than "elements" as printed.

Column 10,
Line 10, delete "aesthetic predetermined" and insert -- predetermined aesthetic --.
Line 58, delete the comma ",".

Column 11,
Line 13, delete "seperate" and insert -- separate --.

Signed and Sealed this

Thirteenth Day of November, 2001

Attest:

NICHOLAS P. GODICI
Attesting Officer    Acting Director of the United States Patent and Trademark Office